United States Patent

Stottle

[11] Patent Number: 5,926,922
[45] Date of Patent: Jul. 27, 1999

[54] CLAMPING STRAP

[75] Inventor: Robert D. Stottle, Huntsville, Ala.

[73] Assignee: Thermal Corporation, Huntsville, Ala.

[21] Appl. No.: 09/027,875

[22] Filed: Feb. 23, 1998

[51] Int. Cl.⁶ ........................................ F16L 33/02
[52] U.S. Cl. .................. 24/23 R; 24/20 R; 24/20 TT
[58] Field of Search ................ 24/20 R, 20 EE, 24/21, 22, 23 EE, 25, 20 TT, 23 R; 248/24.3; 432/225

[56] References Cited

U.S. PATENT DOCUMENTS

| | | |
|---|---|---|
| 583,454 | 6/1897 | Burns . |
| 973,532 | 10/1910 | McLaughlin ................. 24/20 TT |
| 1,559,049 | 10/1925 | Rutledge . |
| 1,709,743 | 4/1929 | Sagenkahn et al. . |
| 2,101,586 | 12/1937 | Leach . |
| 2,947,055 | 8/1960 | McHenry ..................... 24/20 EE X |
| 4,183,120 | 1/1980 | Thorne . |
| 4,483,556 | 11/1984 | LiVolsi . |
| 4,557,024 | 12/1985 | Roberts et al. . |
| 5,172,879 | 12/1992 | Calmettes et al. . |
| 5,267,375 | 12/1993 | Lasmar ........................... 24/268 |
| 5,359,179 | 10/1994 | Desloge et al. . |
| 5,402,554 | 4/1995 | Oetiker ..................... 24/20 TT X |

*Primary Examiner*—James R. Brittain
*Attorney, Agent, or Firm*—John C. Garvin, Jr.

[57] ABSTRACT

A clamping apparatus for use with band heaters for heating nozzles of plastic extruding and injection molding machines to maintain intimate contacts between the heater and the cylindrical surface being heated as well as a clamping apparatus of general application for maintaining intimate contact between the apparatus and the cylindrical object to be clamped. The clamping apparatus comprises a generally cylindrical strap incorporating a heater mechanism, or without a heater mechanism therein, which includes end portions, at least one of which has an upstanding tab with one or more openings therein for receiving a ratchet clip which upon movement thereof, causes the interior of the cylindrical strap to tightly engage the generally cylindrical object to be clamped.

3 Claims, 2 Drawing Sheets

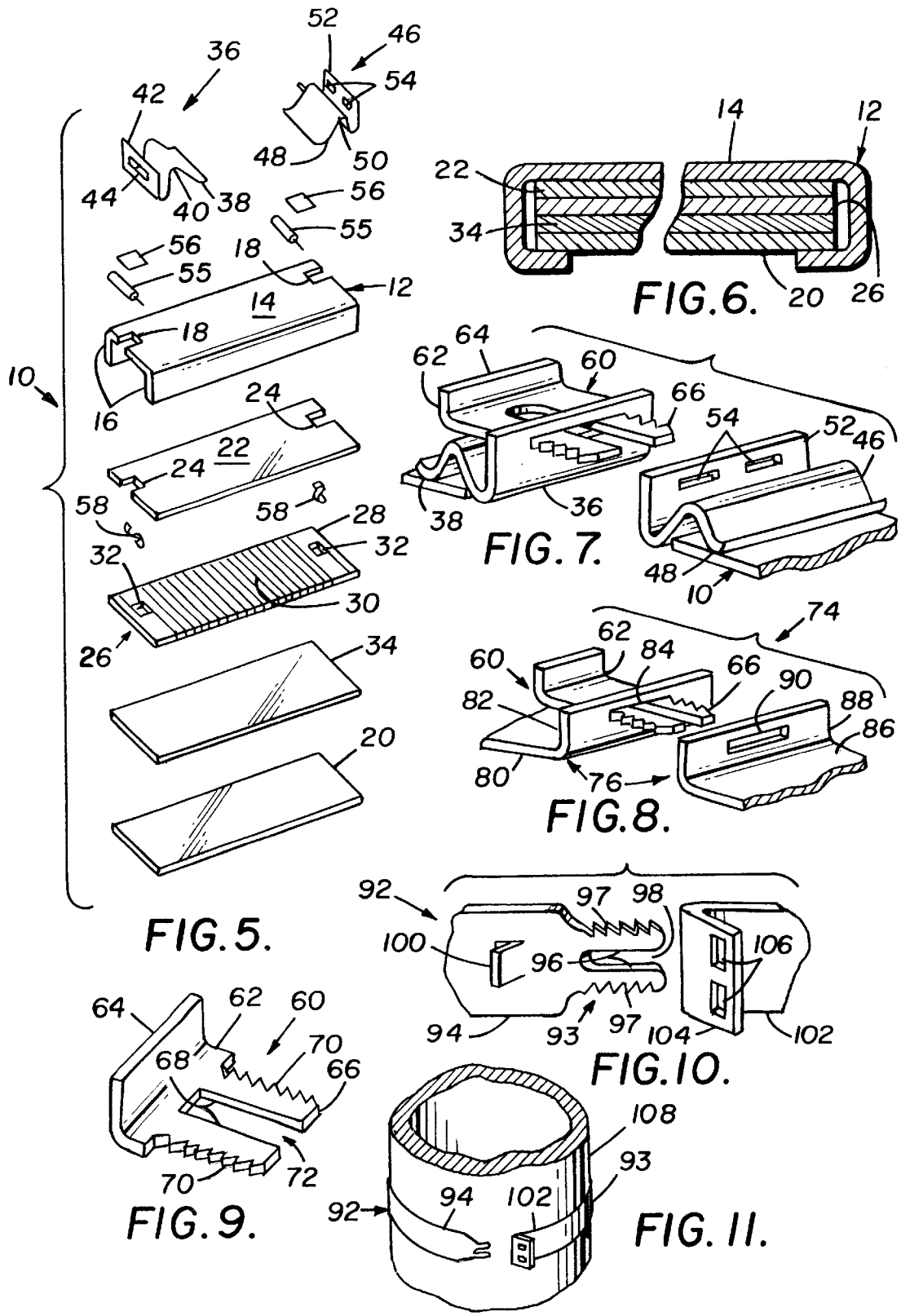

CLAMPING STRAP

FIELD OF THE INVENTION

This invention relates to a clamping apparatus of general application and more particularly to clamping apparatus for use with band heaters for heating barrels and nozzles of plastic extruding and injection molding and machines to maintain intimate contact between the heater and the cylindrical surface being heated.

BACKGROUND OF THE INVENTION

There are now several clamping apparatuses presently used in association with band heaters. One common clamping apparatus is a screw and nut arrangement as generally shown in FIG. 1 wherein a screw and nut is used to tighten and hold the clamping strap to an object. The screw and nut arrangement possesses numerous disadvantages or deficiencies, namely: (1) the male screw is hard to start into the female nut on a hot plastic extruding and injection molding machine; (2) the screw and nut arrangement has a high profile which requires clearance around the clamping strap; (3) the screw and nut arrangement provides little flexibility to maintain tension on the clamping strap if and when thermal expansion causes the strap and cylinder diameters to change relative to each other; and (4) the screw and nut arrangement is relatively expensive when compared to the arrangement of the present invention. Another common clamping apparatus is a spring clamp arrangement as generally depicted in FIG. 2. The principal disadvantages or deficiencies of the spring clamp arrangement are: (1) the clamp has a high profile which requires clearance around the clamping strap; and (2) the spring clamp arrangement is quite expensive when compared to the arrangement of the present invention. Another clamping apparatus is a wedge arrangement wherein a sheet metal wedge having two tapered flanges fits over the ears formed on the clamping strap for moving the ears towards each other, as generally shown in FIG. 3. The wedge arrangement also possesses numerous disadvantages or deficiencies, namely: (1) the sheet metal wedge can easily become loose and work its way off of the ears of the clamping strap; (2) the wedge arrangement provides no flexibility to maintain tension on the strap when thermal expansion causes the diameters of the clamping strap and cylinder to change relative to each other; and (3) the wedge arrangement is very expensive when compared to the arrangement of the present invention.

Numerous patents disclose clamping straps useful for numerous applications as exemplified by the following U.S. Pat. No. 583,454 to Burns; U.S. Pat. No. 1,559,049 to Rutledge; U.S. Pat. No. 1,709,743 to Sagenkahn et al.; U.S. Pat. No. 2,101,586 to Leach; U.S. Pat. No. 4,183,120 to Thorne; U.S. Pat. No. 4,483,556 to Li Volsi; U.S. Pat. No. 4,557,024 to Roberts et al.; U.S. Pat. No. 5,172,879 to Calmettes et al; and U.S. Pat. No. 5,359,179 to Desloge et al.

The Desloge patent discloses a band and strip heater for heating barrels and nozzles of plastic extruding and injection molding machine which incorporates a screw and nut clamping arrangement as generally depicted in FIG. 1 for maintaining intimate contact between the heater and the cylindrical surface to be heated. The Sagenkahn et al patent discloses a generally cylindrical clamping strap having a first end tab or ear with an opening therein, a second end tab or ear with an opening therein, and a latch mechanism having ratchet teeth on one of its edges. In operation, the clamping strap of Sagenkahn et al is tightly secured about a cylindrical member by thrusting the latch mechanism into the openings in the first and second end tabs or ears to cause the ratchet teeth to ride over the walls of the openings to lock the clamping strap onto the cylindrical member. The Leach patent discloses several embodiments of a clamping strap, with the embodiment disclosed in FIGS. 4 and 5 being somewhat pertinent to the present invention. Leach, in FIGS. 4 and 5, discloses a generally cylindrical clamping strap including a first arcuate section having a reduced, closed, end portion with a plurality of ratchet teeth along its side edges and a cutout separating the side edges; and a second arcuate section having an end portion with a generally oblong slot. In operation, the clamping strap of Leach is tightly secured around a cylindrical object by thrusting the reduced end portion of first arcuate section into the generally oblong slot in second arcuate section to cause the ratchet teeth to ride over the side walls of the to lock the clamping strap to the cylindrical body.

SUMMARY OF THE INVENTION

The present invention is directed to a clamping apparatus capable of use with band heaters for heating nozzles of plastic extruding and injection molding machines to maintain intimate contacts between the heater and the cylindrical surface being heated as well as a clamping apparatus of general application for maintaining intimate contact between the apparatus and the cylindrical object to be clamped.

The present invention comprises a clamping apparatus comprising a generally cylindrical strap incorporating a heater mechanism, or without a heater mechanism therein, which includes end portions, at least one of which has an upstanding tab with one or more openings therein for receiving a ratchet clip which upon movement thereof, causes the interior of the cylindrical strap to tightly engage the generally cylindrical object to be clamped.

Accordingly, it is an object of the present invention to provide a clamping apparatus of simple construction capable of being tightly clamped around one or more objects.

It is a further object of the present invention to provide a clamping apparatus of general application including ratchet teeth capable of tightly clamping one object to another object.

It is yet a further object of the present invention to provide a clamping apparatus including a heating mechanism therein for heating nozzles of plastic extruding and injection molding machine to maintain intimate contact between the clamping apparatus and the cylindrical surface being heated.

These and other objects and advantages of the present invention will become apparent to those skilled in the art after considering the following detailed specification in conjunction with the accompanying drawings.

BRIEF DESCRIPTION OF THE DRAWINGS

FIG. 5 is an exploded, perspective, view of the preferred embodiment of the band heater (without its ratchet clip) showing the various components associated therewith.

FIG. 6 is a cross-sectional view of an assembled band heater shows in FIGS. 4, 5 and 7.

FIG. 7 is a partially broken away, perspective, view of the preferred embodiment of the clamping strap and ratchet clip of the present invention as used with a band heater.

FIG. 8 is a partially broken away, perspective, view of the clamping strap and ratchet clip of the first embodiment of the invention as used outside of a band heater environment.

FIG. 9 is a perspective view of the ratchet clip used with the clamping strap or band heater of the first embodiment of present invention.

FIG. 10 is a partially broken away, perspective, view of a second embodiment of the clamping strap of the present invention wherein the ratchet clip forms an integral part of the clamping strap.

FIG. 11 is a partially broken away, perspective, view of the second embodiment of the clamping strap of the present invention as shown in FIG. 10 which surrounds a member to which the strap is to be clamped.

DESCRIPTION OF THE PREFERRED EMBODIMENTS

Figure 1:
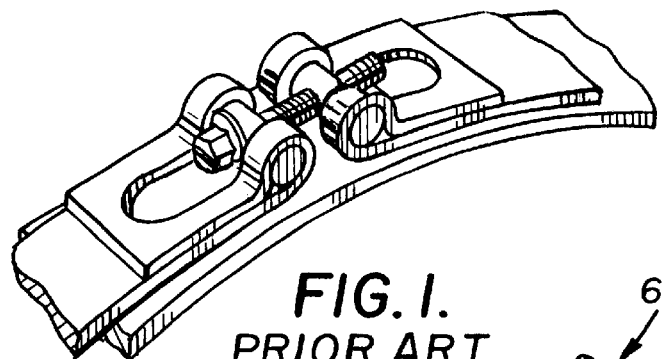
FIG. 1 is a partially broken away, perspective, view of a prior art clamping strap having a screw and nut arrangement.
Figure 2:
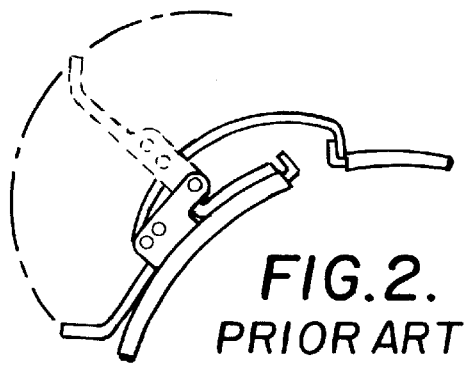
FIG. 2 is a partially broken away, side elevational view of a prior art clamping strap having a spring clamp arrangement.
Figure 4:
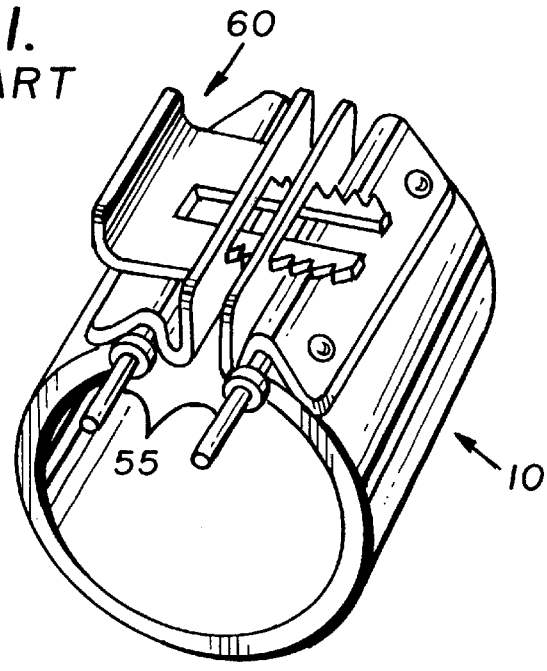
FIG. 4 is a perspective view of a band heater with clamping means constructed in accordance to the teachings of the present invention.
Figure 3:
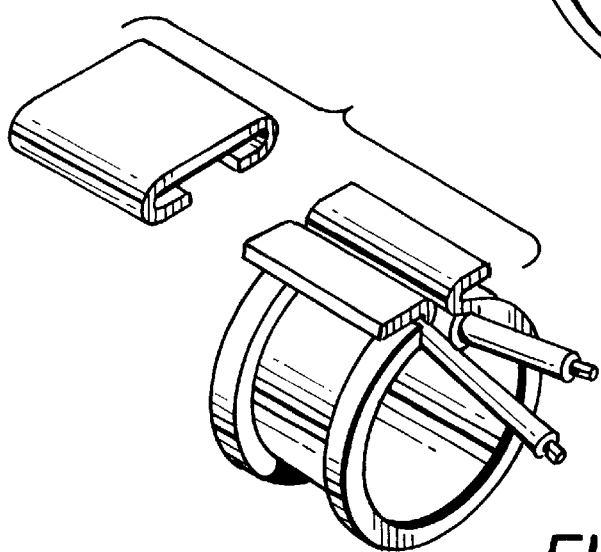
FIG. 3 is an exploded view of a prior art clamping strap of the wedge arrangement.

As best shown in FIGS. 4 and 5, reference numeral 10 designates the preferred embodiment of the band and strip heater assembly of the present invention. As best shown in FIGS. 5 and 6, heater assembly 10 comprises a channel-shaped metal sheath or covering 12 having an upper portion 14, a pair of downwardly extending opposed side walls 16, and a pair of opposed notches 18 in upper portion 14; a metal back up plate 20; a first mica insulator member 22 having a pair of opposed notches 24; a heating element 26 comprising a winder 28 having an electrical resistance wire 30 wound thereon and a pair of spaced opposed openings 32; a second mica insulator member 34; a first transition element 36 having a base 38 with a wire receiving bend 40 therein, and an upstanding tab 42 with a single elongated slot 44 therein; a second transition element 46 having a base 48 with a wire receiving bend 50 therein, and an upstanding tab 52 with a pair of elongated slots 54 therein; a pair of electrical wires 55; a pair of insulators 56; a pair of S-shaped clips 58; and a ratchet clip 60. The notches 18 in metal sheath or covering 12 are slightly larger that the notches 24 in first mica insulator member 22 to allow the wires 55 and the clips 58 to be inserted between mica 56 and first mica insulator member 22.

Heater assembly 10, as depicted in FIG. 5, is best assembled as follows:

a. The channel-shaped metal sheath 14, the first mica insulator member 22, and the winder 28 are moved together such that the openings 32 in winder 28 are brought into alignment with respective notches 24 and 18 of first mica insulator member 22 and metal sheath 14 such that the first mica insulator member 22 and winder 28 are within the downwardly extending side walls 16 of channel-shaped metal sheath 12.

b. Each S-shaped clips 58 is next inserted through respective openings 32 and notches 24 and 18 such that one of its ends makes contact with a respective end of electrical resistance wire 32 on winder 28 with its other end making contact with the electrical wire 55.

c. The second mica insulator member 34 and metal back up plate 20 are next moved up such that the upper surface of second mica insulator member 34 engages the lower surface of winder 28 and the lower surface of second mica insulator member 34 engages the upper surface of metal back up plate 20, at which time the downwardly extending walls 16 of metal sheath 12 are crimped towards each other to sandwich first mica insulator member 22, winder 28, second mica insulator member 34 and metal back up plate 20 within metal sheath 12 as depicted in FIG. 6.

d. The bases 38 and 48 of respective first and second transition members 36 and 46 are next spot welded (as best shown in FIG. 7) to the upper portion 14 of metal sheath 12.

e. The end of a respective lead wire 55 is next tucked under the upper end of a respective S-shaped clip 58 to secure contact between a respective lead wire 55 to a respective S-shaped clip 58, after which a mica insulator 56 is placed over the top of a respective lead wire 55.

f. The assembled heater assembly 10 is next formed by suitable machinery to transpose it from a generally flat configuration to a generally cylindrical configuration.

As best shown in FIGS. 7 and 9, clamping ratchet clip 60 is made from a single piece of material such as sheet metal or a well known plastic and comprises a handle portion 62 and a locking portion 66. Handle portion 62 of rachet clip 60 includes an upstanding edge 64. Locking portion 66 of ratchet clip 60 comprises a pair of spaced, parallel, fingers 68, each being integral with handle portion 62 at one of their ends and being separated by an opened, elongated, gap 72 with the walls of gap 72 being parallel to each other for the full length of each finger 68. Each spaced finger 68 has a plurality of spaced ratchet teeth 70 on its outer edge.

Referring now to FIG. 8 of the drawings, reference numeral 74 designates a clamping apparatus of the present invention that may be used solely for clamping purposes and not having a heater assembly associated therewith. Clamping apparatus 74 generally comprises two major components, namely a clamping strap 76 and a clamping clip 60. Clamping strap 76 is generally cylindrical and comprises a central portion (not shown) and two end portions 80 and 86. End portion 80 of strap 76 has an upwardly extending tab 82 with a generally rectangular opening 84 therein. End portion 86 of strap 74 has an upwardly extending tab 88 with either one or two generally rectangular openings 90 therein.

Referring now to FIGS. 10 and 11 of the drawings, reference numeral 92 designates a second embodiment of the clamping apparatus of the present invention that may be used solely for clamping purposes and not having a heater assembly associated therewith. Clamping apparatus 92 includes an integral clamping strap 93 which is generally cylindrical and comprises a first end portion 94 which terminates in a reduced end (not numbered) with a pair of spaced, parallel, fingers 96, each having a plurality of ratchet teeth 97 on its outer edge and being separated by an opened, elongated, gap 98 with the walls of gap 98 being parallel to each other for the full length of each finger 96 and an upwardly extending tab 100; and a second end portion 102 having an upwardly extending tab 104 with one or more openings 106 therein. As best shown in FIG. 11, reference numeral 108 designates a cylindrical object to be clamped by either the clamping apparatus 74 as shown in FIG. 8 or the clamping apparatus 92 as shown in FIG. 10.

When used in association with a band heater for heating barrels or nozzles of plastic extruding and injection molding machines, the assembled clamp heater assembly 10 is first placed over a barrel or nozzle of a plastic extruding or injection molding machine with the upwardly extending tabs 42 and 52 of first and second transition members 36 and 46 being spaced from each other, the spaced fingers 68 of ratchet clip 60 are then thrust through opening 44 of upwardly extending tab 42 and through openings 54 of upwardly extending tab 52, which action causes upwardly extending tabs 42 and 52 to flex towards each other to apply tension to metal sheath or covering 12 to tighten the heater assembly 10 about the barrel or nozzle of the plastic extruding or injection molding machine, during which time the ratchet teeth 70 rides over the outer side edges of the openings 54 of upwardly extending tab 52 to tightly lock the heater assembly 10 onto the barrel or nozzle of the plastic extruding or injection molding machines. While the spaced fingers 68 of ratchet clip 60 are being thrust through openings 54 of upwardly extending tab 52, the spaced fingers 68 flex inwardly and outwardly due to the elongated gap 72 which separates fingers 68.

When used outside of a band heater environment, the clamping strap 76 of the first embodiment of the clamping apparatus 74 is first placed over a cylindrical element 108 such as shown in FIG. 11 with its upwardly extending tabs 82 and 88 being spaced from each other, the spaced fingers 68 of ratchet clip 60 are then thrust through opening 84 of upwardly extending tab 82 and through opening 90 of upwardly extending tab 88, which action causes upwardly extending tabs 82 and 88 to flex towards each other to apply tension to clamping strap 76 to tighten the clamping strap 76, during which time the ratchet teeth 70 rides over the outer side edges of the opening 90 of upwardly extending tab 88 to tightly lock the clamping strap 76 onto the cylindrical element 108. While the spaced fingers 68 of ratchet clip 60 are being thrust through opening 90 of upwardly extending tab 88, the spaced fingers 68 flex inwardly and outwardly due to the elongated gap 72 which separates fingers 68.

When used outside of a band heater environment, the clamping strap 93 of the second embodiment of the clamping apparatus 92 is first placed over a cylindrical element 108 such as shown in FIG. 11 with its ends spaced from each other, the spaced fingers 96 on first end portion 94 of clamping strap 93 are then thrust through openings 106 of upwardly extending tab 104 by engagement of upwardly extending tab 100, which action causes upwardly extending tab 104 to flex to tighten the clamping strap 93, during which time the ratchet teeth 97 rides over the outer side edges of the openings 106 of upwardly extending tab 104 to tightly lock the clamping strap 93 onto the cylindrical element 108. While the spaced fingers 96 are being thrust through openings 106 of upwardly extending tab 104, the spaced fingers 96 flex inwardly and outwardly due to the elongated gap 98 which separates fingers 96.

Since various modifications can be made in the invention as herein above described, and many apparently widely different embodiments of same made within the spirit and scope of the claims without departing from such spirit and scope, it is intended the all matter contained in the accompanying specification shall be interpreted as illustrative only and not in a limiting sense.

I claim:

1. Clamping apparatus for attachment to a supporting structure, said clamping apparatus comprising:

a metal strap wound on itself to form an open ring and including a first end portion and a second end portion;

a locking member for secured relation of said first and second end portions;

first locking member retaining means carried on said first end portion of said metal strap, said first locking member retaining means including an upstanding tab with at least one slot to receive and releasably retain said locking member therein, said slot having a pair of side walls; and second locking member retaining means secured to said second end portion of said metal strap, said second locking member retaining means including an upstanding tab having at least one slot therein to receive and releasably retain said locking member therein, said slot having a pair of side walls;

said locking member includes a clip having a handle portion and a locking portion, said locking portion including a pair of extending fingers, each said extending finger having inner and outer edges, said outer edges of said extending fingers having a series of spaced ratchet teeth thereon for engaging said side walls of said at least one slot of said second locking member retaining means, said inner edges of said extending fingers being parallel to each other for their full lengths and defining an elongated gap separating said extending fingers, said extending fingers being disposed for compressed relation therebetween for insertion into said slots and for expanded relation responsive to insertion in and removal from said slots, during which insertion said upstanding tabs flexes to apply tension to said metal strap to cause said metal strap to tightly engage the supporting structure.

2. A clamping apparatus for attachment to a supporting structure, said clamping apparatus comprising:

a metal strap wound on itself to form an open ring and including first and second end portions;

first means secured to said first end portion of said metal strap, said first means including an upstanding, transversely extending, tab with at least one slot therein having a pair of side walls; and second means secured to said second end portion of said metal strap, said second means including means for insertion through said at least one slot of said first means for engaging said side walls of said at least one slot of said first means whereby said metal strap tightly engages the supporting structure, said means for insertion through said at least one slot of said first means includes a pair of extending parallel fingers, each said extending finger having inner and outer edges, said outer edges of said extending fingers having a series of spaced ratchet teeth thereon for engaging said side walls of said at least one slot of said first means as said extending fingers are inserted through said at least one slot, during which insertion said upstanding tab flexes to apply tension to said metal strap to cause said metal strap to tightly engage the supporting structure, said inner edges of said extending fingers being parallel to each other for their full lengths and defining an elongated gap separating said extending fingers.

3. A clamping apparatus incorporated in a band heater for attaching the band heater to the nozzle of an injection molding machine, said clamping apparatus comprising:

a metal strap forming a part of the band heater and being wound on itself to form an open ring, said metal strap including a first end portion and a second end portion;

first means secured to said first end portion of said metal strap, said first means including an upstanding, transversely extending, tab with at least one slot therein having a pair of side walls;

second means secured to said second end portion of said metal strap, said second means including an upstanding, transversely extending, tab having at least one slot therein having a pair of side walls; and means for insertion through said at least one slot of said first means secured to said first end portion of said metal strap and through said at least one slot of said second means secured to said second end portion of said metal strap and including a clip having a handle portion and a locking portion, said locking portion including a pair of extending fingers, each said extending finger having inner and outer edges, said outer edges of said extending fingers having a series of spaced ratchet teeth thereon for engaging said side walls of said at least one slot of said second means, said inner edges of said extending fingers being parallel to each other for their full lengths and defining an elongated gap separating said extending fingers, said extending fingers being disposed for compressed relation therebetween for insertion into said at least one slots of said first and second means and for expanded relation responsive to insertion in and removal from said slots whereby said upstanding tabs flexes toward each other to apply tension to said metal strap to tightly engage the nozzle of the injection molding machine.

* * * * *